(12) United States Patent
Yao et al.

(10) Patent No.: US 12,030,101 B2
(45) Date of Patent: Jul. 9, 2024

(54) VARIABLE THICKNESS EXTRUDED MOBILE DEVICE ENCLOSURE COVERS

(71) Applicant: Microsoft Technology Licensing, LLC, Redmond, WA (US)

(72) Inventors: Zhicong Yao, Seattle, WA (US); Kenneth Charles Boman, Carnation, WA (US); Massood Nikkhah, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 17/400,604

(22) Filed: Aug. 12, 2021

(65) Prior Publication Data

US 2023/0051228 A1 Feb. 16, 2023

(51) Int. Cl.
*B21D 22/02* (2006.01)

(52) U.S. Cl.
CPC .................... *B21D 22/02* (2013.01)

(58) Field of Classification Search
CPC ... B21D 5/01; B21D 5/02; B21D 5/16; B21D 22/02; B21D 35/006; B21D 51/06; B21C 23/142; H05K 5/03; H05K 5/04; G06F 1/1613; G06F 1/1616; G06F 1/1656; G06F 1/1658; G06F 1/1698; G06F 1/181; G06F 1/182; Y10T 29/49016
See application file for complete search history.

(56) References Cited

U.S. PATENT DOCUMENTS 7,263,869 B2    9/2007   Durney et al.
7,911,774 B2    3/2011   Nakanishi et al.
(Continued)

FOREIGN PATENT DOCUMENTS

CN    104801644 B    3/2017
CN    106888563 A   *   6/2017  ........... B21C 23/142
(Continued)

OTHER PUBLICATIONS

CN-106888563-A translation provided by Search Fit database (Year: 2023).*
(Continued)

*Primary Examiner* — Jeffrey T Carley
*Assistant Examiner* — Joshua D Anderson
(74) *Attorney, Agent, or Firm* — Holzer Patel Drennan (57) ABSTRACT

Enclosure covers for mobile computing devices are often formed from planar sections of sheet metal that form opposing outer-most layers thereof. The enclosure covers generally enclose and protect internal components. Enclosure covers for mobile computing devices are typically made from planar extrusions of aluminum with subsequent computer numerical control (CNC) machining and other processing steps to achieve complex shapes. Machining can be particularly wasteful of material and numerous processing steps are time-consuming and costly. The presently disclosed variable thickness enclosure covers sourced from extruded sheets of variable thickness reduce or eliminate machining and other processing steps typically required to achieve a desired complex shape. This is accomplished by extruding a shape closer to the desired shape of the variable thickness enclosure cover than presently known.

9 Claims, 10 Drawing Sheets

(56) References Cited

U.S. PATENT DOCUMENTS

| | | |
|---|---|---|
| 8,499,607 B2 | 8/2013 | Kleber et al. |
| 9,165,486 B2 | 10/2015 | Yu et al. |
| 9,829,924 B2 | 11/2017 | Shin et al. |
| 10,603,702 B2 | 3/2020 | Nikaido et al. |
| 2003/0184961 A1 | 10/2003 | Ahn |
| 2007/0063649 A1 | 3/2007 | Yoda et al. |
| 2007/0236870 A1* | 10/2007 | Hachino ............... B21C 23/142 |
| | | 29/592.1 |
| 2010/0091442 A1 | 4/2010 | Theobald et al. |
| 2011/0122576 A1 | 5/2011 | Kuo et al. |
| 2011/0267755 A1 | 11/2011 | Chen |
| 2013/0309444 A1* | 11/2013 | Steinhoff .................. B32B 1/08 |
| | | 428/125 |
| 2014/0146513 A1* | 5/2014 | Choi ................. G02F 1/133308 |
| | | 156/196 |
| 2020/0379521 A1 | 12/2020 | Smethurst |
| 2021/0114076 A1 | 4/2021 | Miyake et al. |
| 2023/0023895 A1* | 1/2023 | Zielnicki ............... G06F 1/1681 |

FOREIGN PATENT DOCUMENTS

| | | |
|---|---|---|
| CN | 108401049 A | 8/2018 |
| CN | 108696610 A | 10/2018 |
| EP | 3613551 A1 | 2/2020 |

OTHER PUBLICATIONS

"International Search Report and Written Opinion Issued in PCT Application No. PCT/US22/037232", dated Nov. 4, 2022, 11 Pages.

\* cited by examiner

VARIABLE THICKNESS EXTRUDED MOBILE DEVICE ENCLOSURE COVERS

BACKGROUND

Mobile computing devices encompass a variety of mobile devices that can be programmed to carry out one or more specific sets of arithmetic and/or logical operations, with or without user input. Enclosure covers for mobile computing devices are often formed from planar sections of sheet metal that form opposing outer-most layers thereof. The enclosure cover encloses and protects internal components of a mobile computing device. Complex manufacturing processes with multiple steps are typically used to turn a planar section of sheet metal into an enclosure cover suitable for a mobile computing device.

SUMMARY

Implementations described and claimed herein provide a method of manufacturing a variable thickness enclosure cover for a computing device. The method comprises extruding a panel having a fixed cross-sectional profile with a first increased thickness feature, removing portions of the first increased thickness feature at each distal end of the first increased thickness feature to accommodate folding of a perimeter of the extruded panel, and stamping the extruded panel to fold upward at the perimeter of extruded panel and define the variable thickness enclosure cover.

Implementations described and claimed herein further provide a variable thickness enclosure cover for a computing device. The variable thickness enclosure cover comprises a first extruded panel having a first fixed cross-sectional profile with a first increased thickness feature. Portions of the first increased thickness feature are removed at each distal end of the first increased thickness feature to accommodate folding of a perimeter of the first extruded panel. The first extruded panel is stamped to fold upward at the perimeter of the first extruded panel and define the variable thickness enclosure cover.

Implementations described and claimed herein still further provide a computing device comprising a first extruded panel and a second extruded panel. The first extruded panel has a first fixed cross-sectional profile with a first increased thickness feature. Portions of the first increased thickness feature are removed at each distal end of the first increased thickness feature to accommodate folding of a perimeter of the first extruded panel. The first extruded panel is stamped to fold upward at the perimeter of the first extruded panel. The second extruded panel has a second fixed cross-sectional profile with a second increased thickness feature. Portions of the second increased thickness feature are removed at each distal end of the second increased thickness feature to accommodate folding of a perimeter of the second extruded panel. The second extruded panel is stamped to fold upward at the perimeter of the second extruded panel. The first extruded panel is assembled with the second extruded panel to define an enclosure that secures electronic components of the computing device.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

Mobile computing devices can generally be categorized into bi-folding devices, such as laptop and notebook computers (see e.g., laptop computer 100 of FIG. 1, discussed in detail below), and tablet-style devices, such as tablet computers, personal digital assistants (PDAs), and smartphones. Bi-folding devices typically include a pair of planar components connected by a hinge that permits the planar components to rotationally move with reference to one another. Each of the planar components of a bi-folding mobile computing device includes an enclosure that secures and protects various electronic components therein that enable the mobile computing device to function. Each of the planar components typically includes an enclosure cover on each planar side thereof to define the enclosure. These enclosure covers may benefit from a variable thickness extrusion that places additional material where additional strength is desired, or where additional thickness can be accommodated within the enclosure. For example, for an enclosure cover used to structurally connect to a hinge, a variable thickness extruded enclosure cover may place additional material adjacent the connection to the hinge to structurally reinforce that area of the enclosure cover.

Similarly, a tablet-style device includes an enclosure that secures and protects various electronic components therein that enable the mobile computing device to function. The tablet-style device typically includes an enclosure cover on each planar side thereof to define the enclosure. This enclosure cover may also benefit from a variable thickness extrusion that places additional material where additional strength is desired, or where additional thickness can be accommodated within the enclosure.

Additional computing devices may not fit neatly into the bi-folding and tablet-style mobile devices categories above (e.g., a tri-folding mobile device or a stationary computing device, such as a desktop computer), however, such devices may include one or more planar components that may similarly benefit from variable thickness extruded enclosure covers as described herein.

Enclosure covers for mobile computing devices (e.g., bi-folding devices and tablet-style devices) are typically made from planar extrusions of aluminum with subsequent computer numerical control (CNC) machining and other processing steps (e.g., blanking, drawing, striking, bending, and so on) to achieve complex shapes. Machining can be particularly wasteful of material (e.g., up to 90% of the extruded planar sheet may be cut away and discarded in conventional manufacturing of an enclosure cover) and numerous processing steps are time-consuming and costly. The presently disclosed variable thickness enclosure covers sourced from extruded sheets of variable thickness reduce or eliminate machining and other processing steps to achieve a desired complex shape. This is accomplished by extruding a shape closer to the desired shape of the variable thickness enclosure cover than presently known.

XYZ coordinates are shown in the FIGS. 1-9A and described below to illustrate directional features of the disclosed technology. Other coordinate systems may also be used with different orientations with similar effect. Further, a variety of features described below are not drawn to scale in FIGS. 1-9B for emphasis and illustration purposes.

Figure 1:
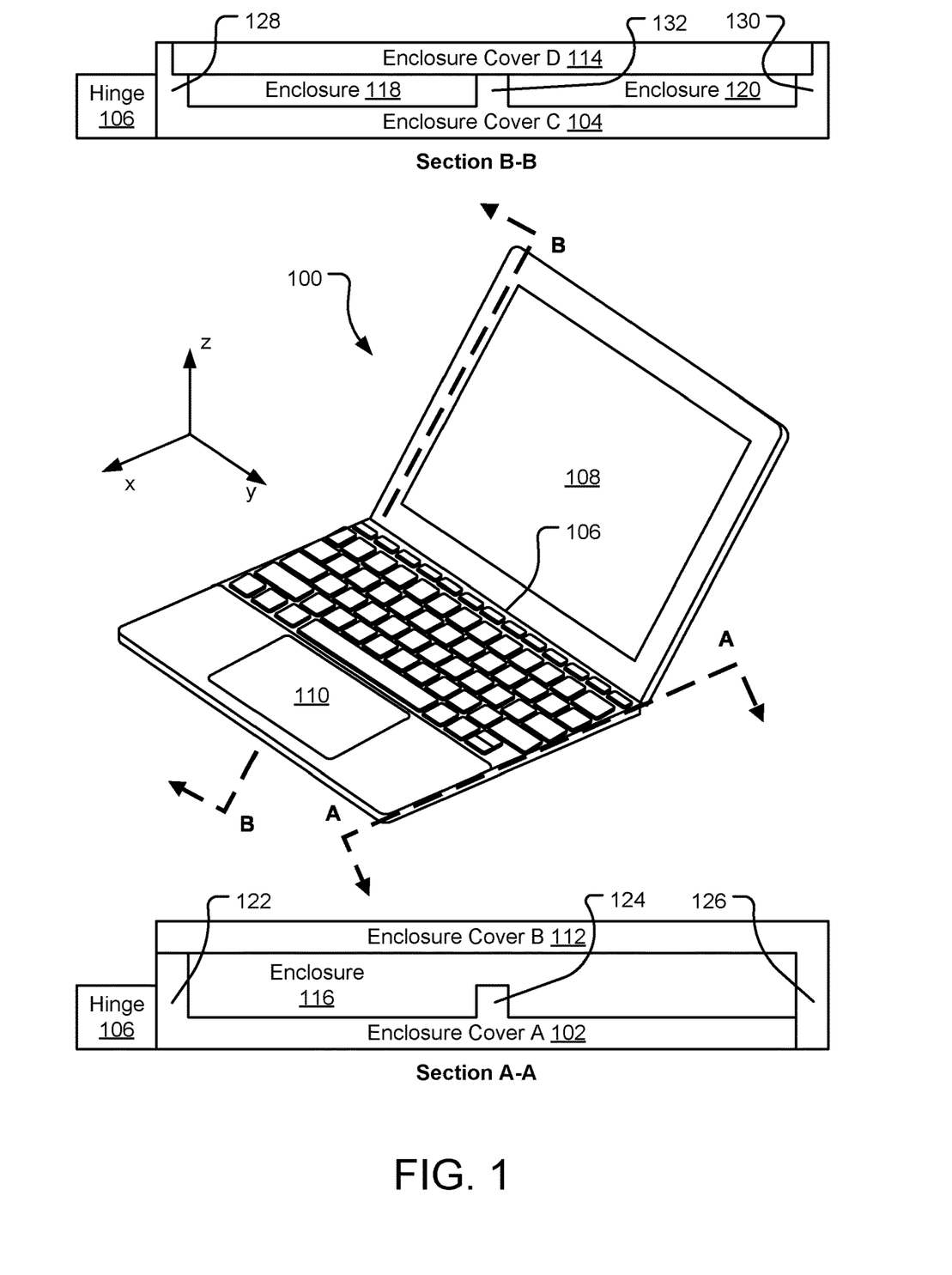
FIG. 1 illustrates a front perspective view and Sections A-A and B-B of an example computing device having enclosure covers formed from an extruded sheet of variable thickness.

FIG. 1 illustrates a front perspective view and Sections A-A and B-B of an example mobile computing device 100 having enclosure covers 102, 112, 104 cut and formed from an extruded sheet of variable thickness (not shown, see e.g., extruded sheet 234 of FIG. 2, discussed below). The mobile computing device 100 is depicted as a bi-folding device, such as a laptop or notebook computer, and includes hinge 106, which pivotally connects a display component (or first planar component) 108 with a keyboard component (or a second planar component) 110 of the device 100. As a result, a user may position the display component 108 at a variety of angles with respect to the keyboard component 110 to achieve a desired viewing angle to the display component 108, or for other user considerations. In other implementations, the device 100 is a tablet-style device, which may conceptually be similar to that described below with reference to one of the planar components 108, 110 with no hinged connection to another planar component.

Section A-A depicts a section of the keyboard component 110 outside of the keyset, but inside of the outermost edge of the keyboard component 110 and looking in the y-direction. As such, enclosure cover A 102 and enclosure cover B 112 come together to create enclosure 116, which secures and protects various electronic components (e.g., a keyset, a touch pad, a battery, circuit boards, batteries, and so on; none shown) therein that enable the mobile computing device 100 to function. In various implementations, enclosure A 102 is a back cover of the keyboard component 110 and enclosure cover B 112 is a top cover of the keyboard component 110, which may include cutouts for the keyset and the touch pad.

Enclosure cover A 102 includes a first increased thickness feature 122, which runs linearly in the y-direction parallel with and adjacent the hinge 106 in order to reinforce the enclosure cover A 102 at its mechanical attachment to the hinge 106. Enclosure cover A 102 also includes a second increased thickness feature 124 also running linearly in the y-direction, which serves to generally reinforce the enclosure cover A 102 against bending forces, particularly in the X-Y plane. Enclosure cover B 112 also includes an increased thickness feature 126, which runs linearly in the y-direction to generally reinforce the enclosure cover B 112 against bending forces, and to provide a seamless appearance to the user when the mobile computing device 100 is viewed from a typical use orientation.

Section B-B depicts a section of the display component 108 outside of the display, but inside of the outermost edge of the display component 108 and looking in the negative y-direction. As such, enclosure cover C 104 and enclosure cover D 114 come together to create enclosures 118, 120, which secure and protects various electronic components (e.g., a display module, a battery, circuit boards, batteries, and so on; none shown) therein that enable the mobile computing device 100 to function. In various implementations, enclosure C 104 is a back cover of the display component 108 and enclosure cover D 114 is a bezel for the display module of the display component 108, which may include a cutout for the display module. In some implementations, the display component 108 lack a bezel for the display module and the enclosure cover D 114 is coverglass of the display module.

Enclosure cover C 104 includes a first increased thickness feature 128, which runs linearly in the y-direction parallel with and adjacent the hinge 106 in order to reinforce the enclosure cover C 104 at its mechanical attachment to the hinge 106. The first increased thickness feature 128 may also have a stepped shape to facilitate proper alignment of the enclosure cover D 114 when attached to the enclosure cover C 104. A similar second increased thickness feature 130 may also be incorporated into the enclosure cover C 104 to further facilitate proper alignment of the enclosure cover D 114 when attached to the enclosure cover C 104. Enclosure cover C 104 also includes a third increased thickness feature 132 also running linearly in the y-direction, which serves to generally reinforce the enclosure cover C 104 against bending forces. In some implementations, increased thickness features 128, 130 are further formed in a subsequent stamping process that connects increased thickness features 128, 130 in the X-direction so that a continuous increased thickness feature runs around the entire perimeter of the enclosure cover C 104.

Enclosure cover D 114 is not depicted with any areas of increased thickness (e.g., when the enclosure cover D 114 is a coverglass of the display module). In other implementations, enclosure cover D 114 may incorporate any one or more increased thickness features running linearly. While example increased thickness features 122, 124, 126, 128, 130, 132 are illustrated in FIG. 1 and described above, the enclosure covers 102, 112, 104, 114 (A-D) may each include one or more increased thickness feature, with functionality as described above, or different functionalities (e.g., increasing stiffness, providing attachment points for the electronic components, providing enclosure sizes and shapes necessary to fit the electronic components, accommodate thermal requirements of the mobile computing device 100, etc.).

The device 100 is depicted as a laptop computer, however, the increased thickness features 122, 124, 126, 128, 130, 132 (or other increased thickness features) may be similarly incorporated within a variety of computing devices, including mobile computing devices and desktop computing devices. Further, while the display component 108 and the keyboard component 110 are illustrated, and discussed in detail herein, the computing device 100 may include any one or more planar components (e.g., a keyboard, a display screen, a touchscreen, a touchpad, a kickstand, a screen cover, and combinations thereof) that are constructed using one or more variable thickness enclosure covers.

Figure 2:
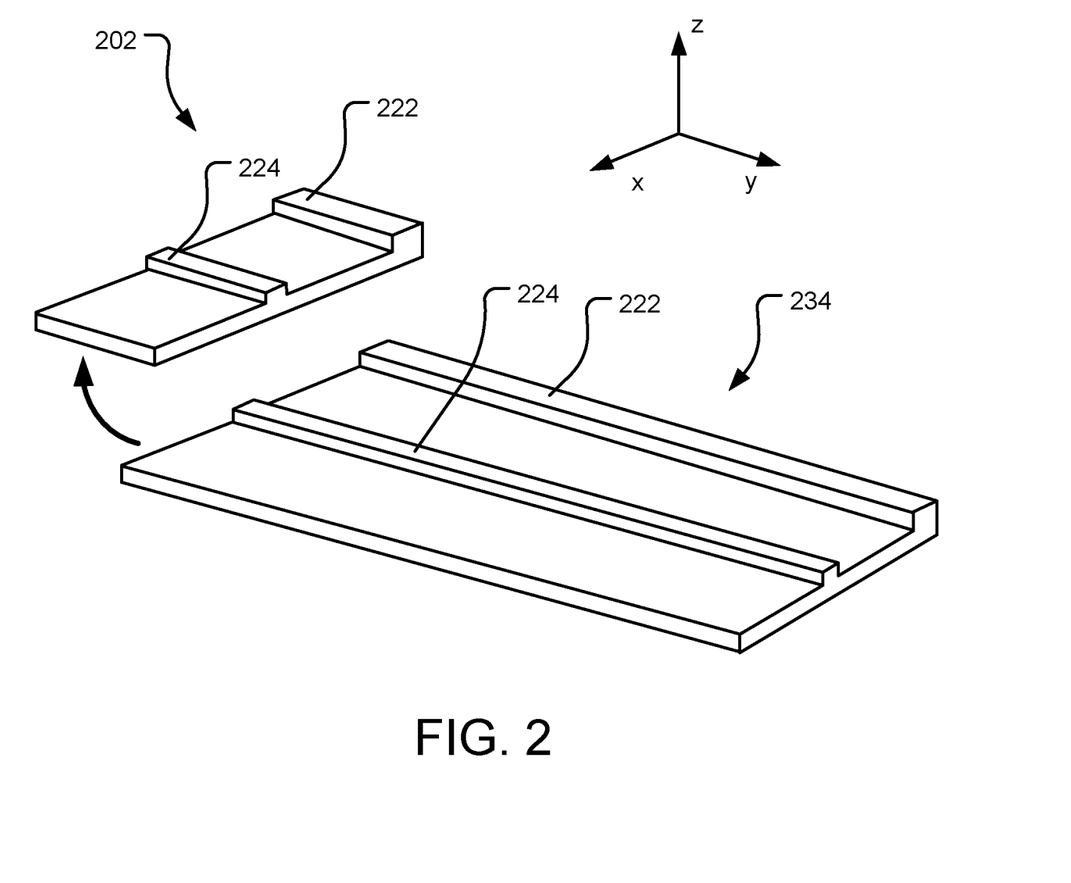
FIG. 2 illustrates a perspective view of an example variable thickness extruded panel cut from an extruded sheet of variable thickness.

FIG. 2 illustrates a perspective view of an example variable thickness extruded panel 202 cut from an extruded sheet 234 of variable thickness. The extruded sheet 234 is formed by an extrusion process that permits the extruded sheet 234 to have a desired fixed cross-sectional profile in the X-Z plane for a predetermined length in the Y-direction. The extruded sheet 234 may be hot extruded (heated at or above the underlying material's recrystallization temperature) or cold extruded (at or near room temperature or 20-30 degrees Celsius) and made of any extrudable material, such as various metal alloys (e.g., aluminum, brass, copper, lead, tin, magnesium, zinc, steel, titanium, and alloys thereof) and various plastics.

The extruded sheet 234 is pushed through a die of the desired fixed cross-sectional profile to form the extruded sheet 234. In other implementations, the extruded sheet 234 is instead drawn through the die. The extrusion process may be continuous, which produces a relatively long extruded sheet 234 that may be subsequently cut up into individual panels, such as variable thickness extruded panel 202, for further processing to form a variable thickness enclosure cover. In other implementations, the extrusion process is semi-continuous in that it produces many pieces, each of which may form the basis of one or more variable thickness extruded panels, such as variable thickness extruded panel 202.

The fixed cross-sectional profile in the X-Z plane defines increased thickness features 222, 224 in both the extruded sheet 234 and the extruded panel 202 cut therefrom. In an example implementation, the first increased thickness feature 222 runs linearly in the Y-direction parallel with and adjacent a hinge (not shown, see e.g., hinge 106 of FIG. 1) in order to reinforce the extruded panel 202 at its mechanical attachment to the hinge when used as a variable thickness enclosure cover. The second increased thickness feature 224 also runs linearly in the y-direction, which serves to generally reinforce the extruded panel 202 against bending forces, particularly in the X-Y plane, when used as a variable thickness enclosure cover.

The increased thickness features 222, 224 of the extruded panel 202 provides a technical benefit to a resulting variable thickness enclosure cover in that fewer processing steps are necessary to achieve a similar end result than convention manufacturing techniques that start with a flat extruded (or otherwise manufactured) panel. Each of the increased thickness features 222, 224 may correspond to a specific feature of the resulting variable thickness enclosure cover that requires increased thickness (e.g., structural reinforcement for hinge supports or features of a computing device). The extruded panel 202 forms a basis for further processing steps to form a variable thickness enclosure cover, as discussed in further detail below.

Figure 3:
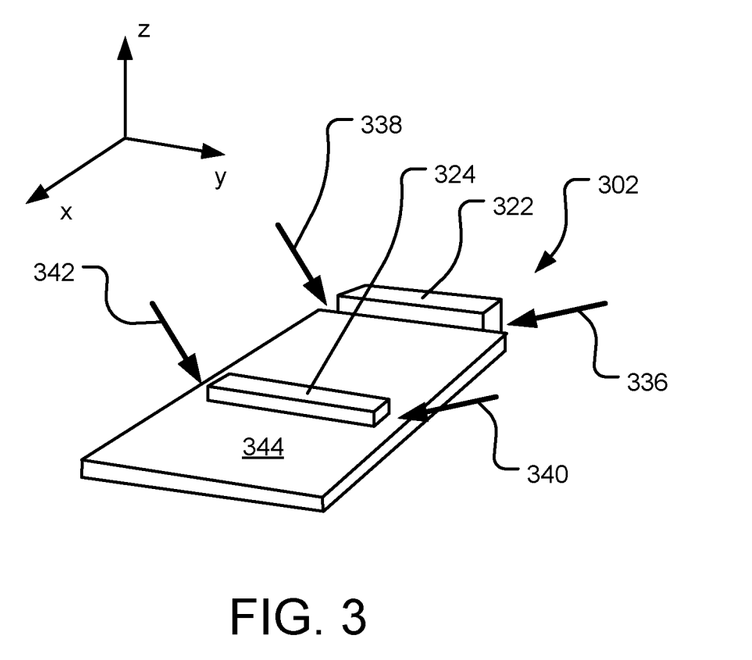
FIG. 3 illustrates a perspective view of a first example variable thickness extruded panel with material removed to accommodate a folded perimeter.

FIG. 3 illustrates a perspective view of a first example variable thickness extruded panel 302 with material removed to accommodate a folded perimeter. The variable thickness extruded panel 302 was previously cut from an extruded sheet with a fixed cross-sectional profile in the X-Z plane (see e.g., extruded panel 202 of FIG. 2). Prior to removal of material, the variable thickness extruded panel 302 was formed by an extrusion process (and in some implementations cut from a longer extruded sheet) to have the depicted cross-sectional profile in the X-Z plane for a predetermined length in the Y-direction.

The cross-sectional profile in the X-Z plane defines increased thickness features 322, 324 and a planar base portion 344. In an example implementation, the first increased thickness feature 322 runs linearly in the y-direction parallel with and adjacent a hinge (not shown, see e.g., hinge 106 of FIG. 1) in order to reinforce the extruded panel 302 at its mechanical attachment to the hinge when used as a variable thickness enclosure cover. The second increased thickness feature 324 also runs linearly in the y-direction, which serves to generally reinforce the extruded panel 302 against bending forces, particularly in the X-Y plane, when used as a variable thickness enclosure cover. The extruded panel 302 forms a basis for further processing steps to form a variable thickness enclosure cover, as discussed in further detail below.

Material is removed from each of the increased thickness features 322, 324 of the variable thickness extruded panel 302 at each of arrows 336, 338, 340, 342. Specifically, at arrow 336, a full depth in the Z-direction of material is removed from a distal end of the increased thickness feature 322, thus reducing the overall length of the increased thickness feature 322 and the planar base portion 344 below the increased thickness feature 322 in the Y-direction. Similarly, at arrow 338, a full depth in the Z-direction of material is removed from the opposite distal end of the increased thickness feature 322 and the planar base portion 344 below the opposite distal end of the increased thickness feature 322, thus further reducing the overall length of the increased thickness feature 322 and the planar base portion 344 below the increased thickness feature 322 in the Y-direction. As a result, an overall length of the variable thickness extruded panel 302 in the Y-direction is greater than that of the increased thickness feature 322.

At arrow 340, a partial depth in the Z-direction of material is removed from a distal end of the increased thickness feature 324, thus reducing the overall length of the increased thickness feature 324 in the Y-direction. The partial depth removal in the Z-direction leaves the planar base portion 344 below the increased thickness feature 324 at the distal end in the Y-direction remaining. Similarly, at arrow 342, a partial depth in the Z-direction of material is removed from an opposite distal end of the increased thickness feature 324, thus reducing the overall length of the increased thickness feature 324 in the Y-direction. The partial depth removal in the Z-direction leaves the planar base portion 344 below the increased thickness feature 324 at the opposite distal end in the Y-direction remaining as well.

The amount of material removed at each of arrows 336, 338, 340, 342 may vary in implementation, and will depend in part on the following further processing steps, one of which will include a stamping or bending operation on the planar base portion 344 to fold upward at the perimeter of the extruded panel 302. The removal of material at each of arrows 336, 338, 340, 342 may be performed by any convenient machining process, including but not limited to drilling, milling, grinding, and cutting). In other implementations, the planar base portion 344 is not planar and may have one or more curved surfaced incorporated therein (see e.g., curved base portions 844 and 944, 945 of FIGS. 8A, 8B and 9A, 9B, respectively, described below), but still serves as a reference surface for the increased thickness feature 322, 324.

Figure 4:
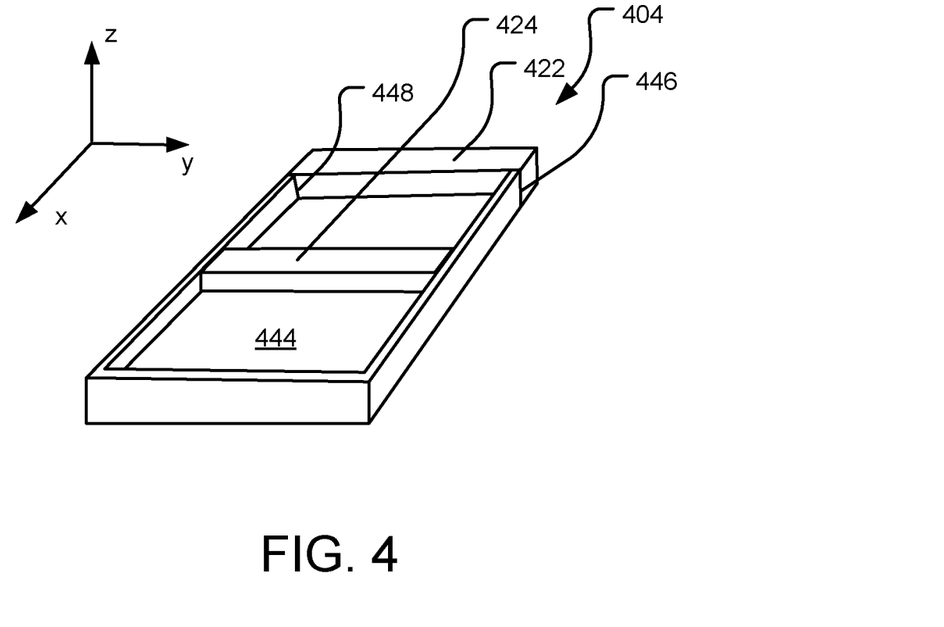
FIG. 4 illustrates the first example variable thickness extruded panel of FIG. 3 with a folded perimeter to form a variable thickness enclosure cover.

FIG. 4 illustrates the first example variable thickness extruded panel 302 of FIG. 3 with a folded perimeter to form a variable thickness enclosure cover 404. The variable thickness enclosure cover 404 was previously cut from an extruded sheet with a fixed cross-sectional profile in the X-Z plane (see e.g., extruded panel 202 of FIG. 2). Prior to removal of material, the variable thickness enclosure cover 404 was formed by an extrusion process (and in some implementations cut from a longer extruded sheet) to have the depicted cross-sectional profile in the X-Z plane for a predetermined length in the Y-direction.

The cross-sectional profile in the X-Z plane defines increased thickness features 422, 424 and a planar portion 444. In an example implementation, the first increased thickness feature 422 runs linearly in the y-direction parallel with and adjacent a hinge (not shown, see e.g., hinge 106 of FIG. 1) in order to reinforce the enclosure cover 404 at its mechanical attachment to the hinge. The second increased thickness feature 424 also runs linearly in the y-direction, which serves to generally reinforce the enclosure cover 404 against bending forces, particularly in the X-Y plane. Material was previously removed from distal ends of each of the increased thickness features 422, 424 of the enclosure cover 404, as described above with reference to variable thickness extruded panel 302 of FIG. 3.

Figure 7:
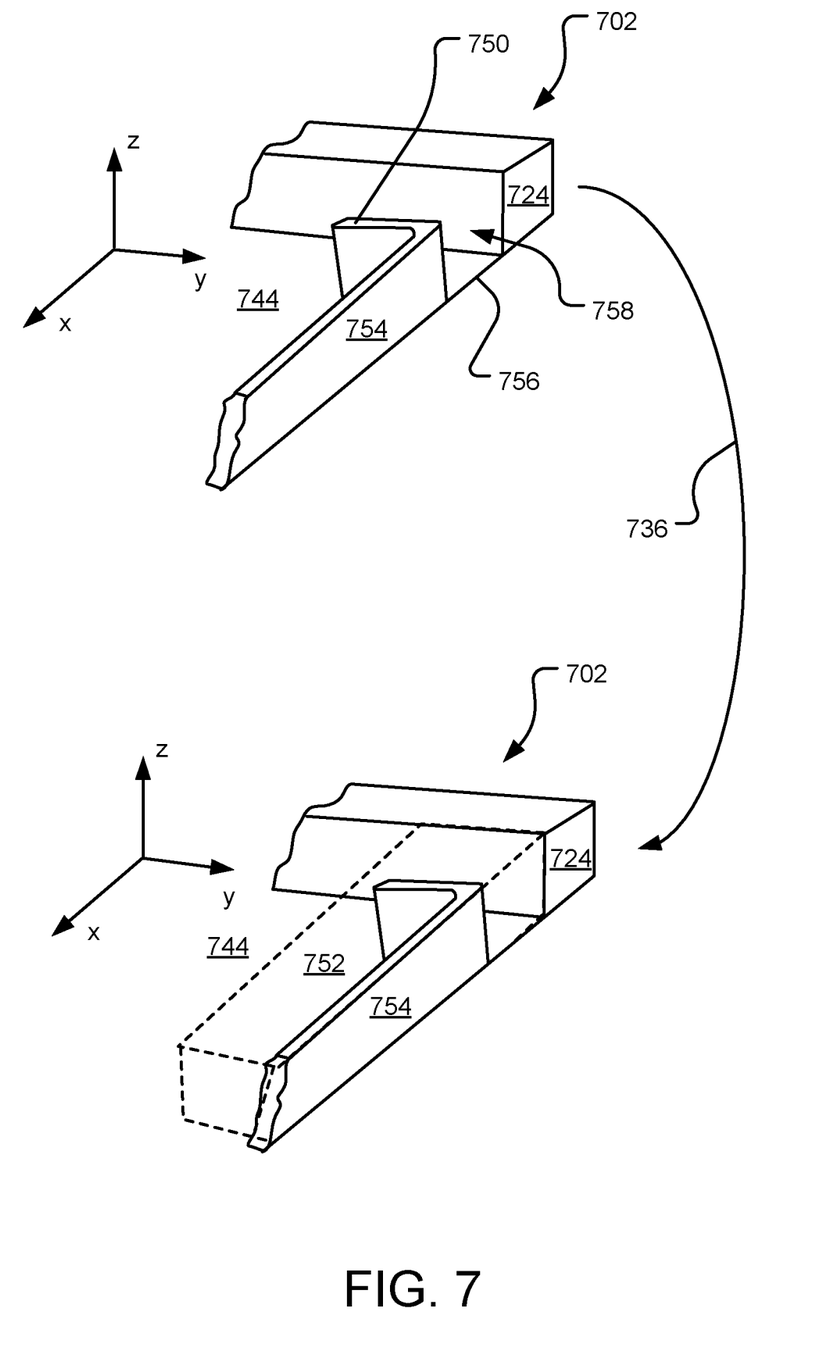
FIG. 7 illustrates a partial perspective view of an example variable thickness enclosure cover with a folded tab to accommodate an antenna.

The variable thickness extruded panel 302 of FIG. 3 has been stamped to fold upward at its perimeter to define the variable thickness enclosure cover 404 depicted in FIG. 4. The resulting folded perimeter of the enclosure cover 404 is flush with the distal ends of the first increased thickness feature 422, as shown. Further, the folded perimeter of the enclosure cover 404 rests against the second increased thickness feature 424 at each distal end of the second increased thickness feature 424, as also shown. The end result is a continuous perimeter around a majority of the enclosure cover 404, with only discontinuities 446, 448 at the distal ends of the first increased thickness feature 422. The continuous perimeter (excepting discontinuities 446, 448) is technically advantageous in that it offers a consistent look and feel to a user. The depicted flush fit minimizes the visual and tactile effect of these discontinuities 446, 448. In some implementations, the discontinuities 446, 448 may be used as antenna windows, as illustrated in FIG. 7 and described in further detail below.

Figure 5:
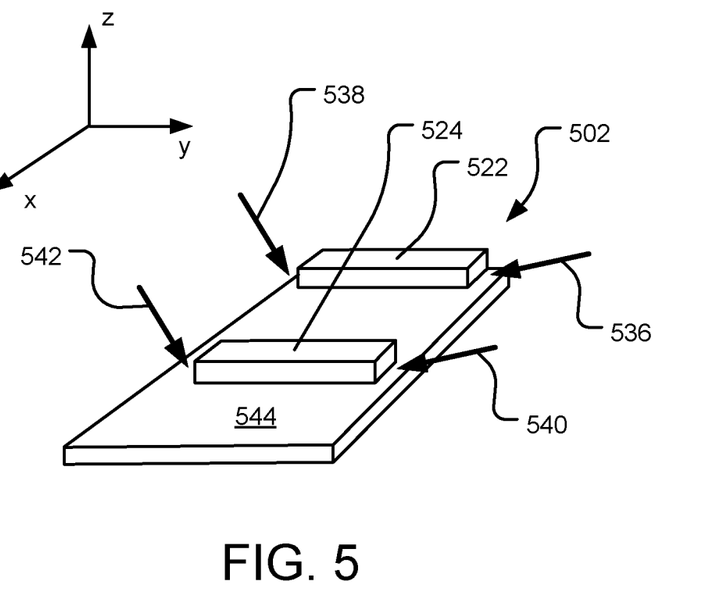
FIG. 5 illustrates a perspective view of a second example variable thickness extruded panel with material removed to accommodate a folded perimeter.

FIG. 5 illustrates a perspective view of a second example variable thickness extruded panel 502 with material removed to accommodate a folded perimeter. The variable thickness extruded panel 502 was previously cut from an extruded sheet with a fixed cross-sectional profile in the X-Z plane (see e.g., extruded panel 202 of FIG. 2). Prior to removal of material, the variable thickness extruded panel 502 was formed by an extrusion process (and in some implementations cut from a longer extruded sheet) to have the depicted cross-sectional profile in the X-Z plane for a predetermined length in the Y-direction.

The cross-sectional profile in the X-Z plane defines increased thickness features 522, 524 and a planar base portion 544. In an example implementation, the first increased thickness feature 522 runs linearly in the y-direction parallel with and adjacent a hinge (not shown, see e.g., hinge 106 of FIG. 1) in order to reinforce the extruded panel 502 at its mechanical attachment to the hinge when used as a variable thickness enclosure cover. The second increased thickness feature 524 also runs linearly in the y-direction, which serves to generally reinforce the extruded panel 502 against bending forces, particularly in the X-Y plane, when used as a variable thickness enclosure cover. The extruded panel 502 forms a basis for further processing steps to form a variable thickness enclosure cover, as discussed in further detail below.

Material is removed from each of the increased thickness features 522, 524 of the variable thickness extruded panel 502 at each of arrows 536, 538, 540, 542. Specifically, at arrow 536, a partial depth in the Z-direction of material is removed from a distal end of the increased thickness feature 522, thus reducing the overall length of the increased thickness feature 522 in the Y-direction. The partial depth removal in the Z-direction leaves the planar base portion 544 below the increased thickness feature 522 at the distal end in the Y-direction remaining. Similarly, at arrow 538, a partial depth in the Z-direction of material is removed from the opposite distal end of the increased thickness feature 522, thus further reducing the overall length of the increased thickness feature 522 in the Y-direction. As a result, an overall length of the variable thickness extruded panel 502 in the Y-direction is greater than that of the increased thickness feature 522.

At arrow 540, a partial depth in the Z-direction of material is removed from a distal end of the increased thickness feature 524, thus reducing the overall length of the increased thickness feature 524 in the Y-direction. The partial depth removal in the Z-direction leaves the planar base portion 544 below the increased thickness feature 524 at the distal end in the Y-direction remaining. Similarly, at arrow 542, a partial depth in the Z-direction of material is removed from an opposite distal end of the increased thickness feature 524, thus reducing the overall length of the increased thickness feature 524 in the Y-direction. The partial depth removal in the Z-direction leaves the planar base portion 544 below the increased thickness feature 524 at the opposite distal end in the Y-direction remaining as well.

The amount of material removed at each of arrows 536, 538, 540, 542 may vary in implementation, and will depend in part on the following further processing steps, one of which will include a stamping or bending operation on the planar base portion 544 to fold upward its perimeter. The removal of material at each of arrows 536, 538, 540, 542 may be performed by any convenient machining process, including but not limited to drilling, milling, grinding, and cutting). In other implementations, the planar base portion 544 is not planar and may have one or more curved surfaced incorporated therein (see e.g., curved base portions 844 and 944, 945 of FIGS. 8A, 8B and 9A, 9B, respectively, described below), but still serves as a reference surface for the increased thickness features 522, 524.

Figure 6:
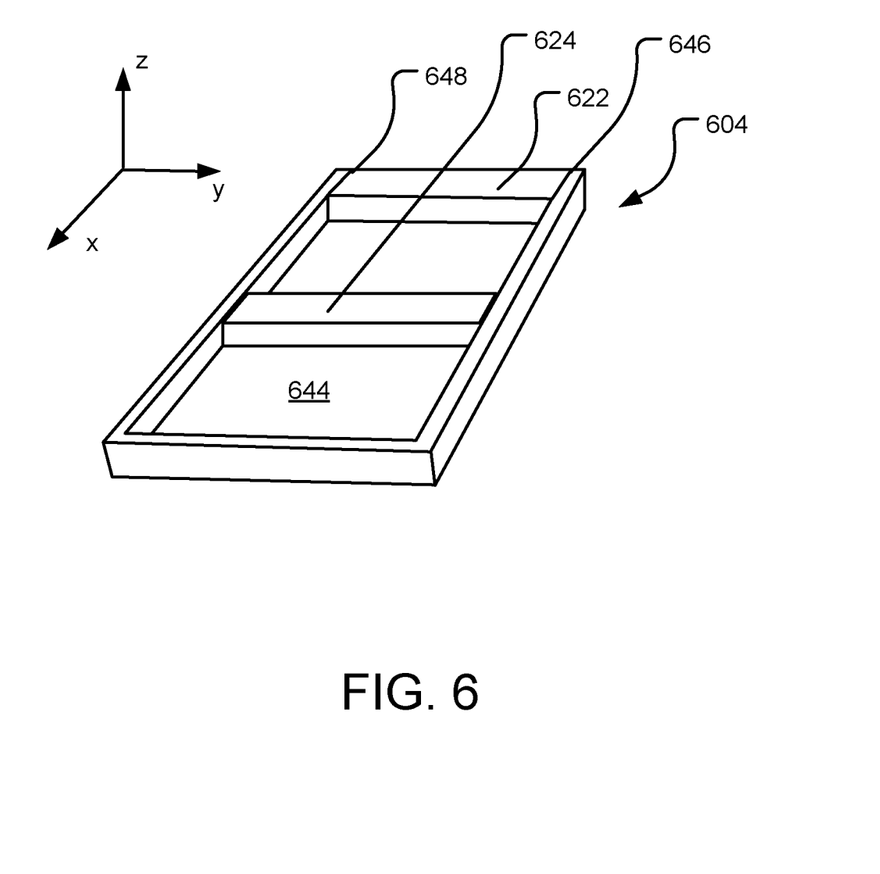
FIG. 6 illustrates the second example variable thickness extruded panel of FIG. 5 with a folded perimeter to form a variable thickness enclosure cover.

FIG. 6 illustrates the first example variable thickness extruded panel 502 of FIG. 5 with a folded perimeter to form a variable thickness enclosure cover 604. The variable thickness enclosure cover 604 was previously cut from an extruded sheet with a fixed cross-sectional profile in the X-Z plane (see e.g., extruded panel 202 of FIG. 2). Prior to removal of material, the variable thickness enclosure cover 604 was formed by an extrusion process (and in some implementations cut from a longer extruded sheet) to have the depicted cross-sectional profile in the X-Z plane for a predetermined length in the Y-direction.

The cross-sectional profile in the X-Z plane defines increased thickness features 622, 624 and a planar portion 644. In an example implementation, the first increased thickness feature 622 runs linearly in the y-direction parallel with and adjacent a hinge (not shown, see e.g., hinge 106 of FIG. 1) in order to reinforce the enclosure cover 604 at its mechanical attachment to the hinge. The second increased thickness feature 624 also runs linearly in the y-direction, which serves to generally reinforce the enclosure cover 604 against bending forces, particularly in the X-Y plane. Material was previously removed from distal ends of each of the increased thickness features 622, 624 of the enclosure cover 604, as described above with reference to variable thickness extruded panel 502 of FIG. 5.

The variable thickness extruded panel 502 of FIG. 5 has been stamped to fold upward at the perimeter of the extruded panel and define the variable thickness enclosure cover 604 depicted in FIG. 6. The resulting folded perimeter of the enclosure cover 604 rests against the first and second increased thickness features 622, 624 at each distal end thereof, as shown. The end result is a continuous perimeter around a majority of the enclosure cover 604, with only discontinuities 646, 648 at the distal ends of the first increased thickness feature 622. The continuous perimeter (excepting discontinuities 646, 648) is technically advantageous in that it offers a consistent look and feel to a user. The depicted flush fit minimizes the visual and tactile effect of these discontinuities 646, 648. In some implementations, the discontinuities 646, 648 may be used as antenna windows, as illustrated in FIG. 7 and described in further detail below.

FIG. 7 illustrates a partial perspective view of an example variable thickness enclosure cover 702 with a folded tab 750 to accommodate an antenna 752. The partial perspective view of the enclosure cover 702 includes a planar portion 744, a portion of which is folded upward at the perimeter of the enclosure cover 702 (referred to as an upturned portion 754), and an increased thickness feature 724. The partial perspective view of the enclosure cover 702 is focused on a discontinuity created during a prior stamping process (see e.g., discontinuity 446, 646 of FIGS. 4 and 6, respectively). Rather than try to conceal the discontinuity, it may be used as a feature to accommodate the antenna 752.

The upturned portion 754 is cut or scribed along line 756 for a distance in the X-direction defining a gap 758 to be occupied by the antenna 752. The folded tab 750 is folded inward from an orientation generally along the X-axis to an orientation generally along the Y-axis, thereby opening up the gap 758. In some implementations, the cut operation is omitted as the upturned portion 754 is thin enough that the folding operation breaks the upturned portion 754 along the line 756. Once the gap 758 is opened, arrow 736 indicates that the antenna 752 (illustrated by dashed lines) fills the gap 758 and a volume inside of the enclosure cover 702. In various implementations, the antenna 752 may be insert molded to fit exactly within the gap 758 and the available volume inside of the enclosure cover 702. Further, the folded tab 750 and surrounding planar portion 744, upturned portion 754, and increased thickness feature 724 may function to lock the antenna 752 in place.

In general, the gap 758 functions as an antennae window and is technically advantageous in that the orientation of the folder tab 750, in conjunction with other portions of the variable thickness enclosure cover 702 locks the antenna 752 in place. Further, placement of the antenna 752 within the gap 758 is technically advantageous in that it conceals the visual and tactile effect of discontinuities (see e.g., discontinuities 646, 648 of FIG. 6) caused by stamping a variable thickness extruded panel to fold upward at a perimeter of the extruded panel. The antenna 752 may further provide a structural strength improvement by filling the gap 758 and connecting surrounding portions of the variable thickness extruded panel together.

Figure 8A:
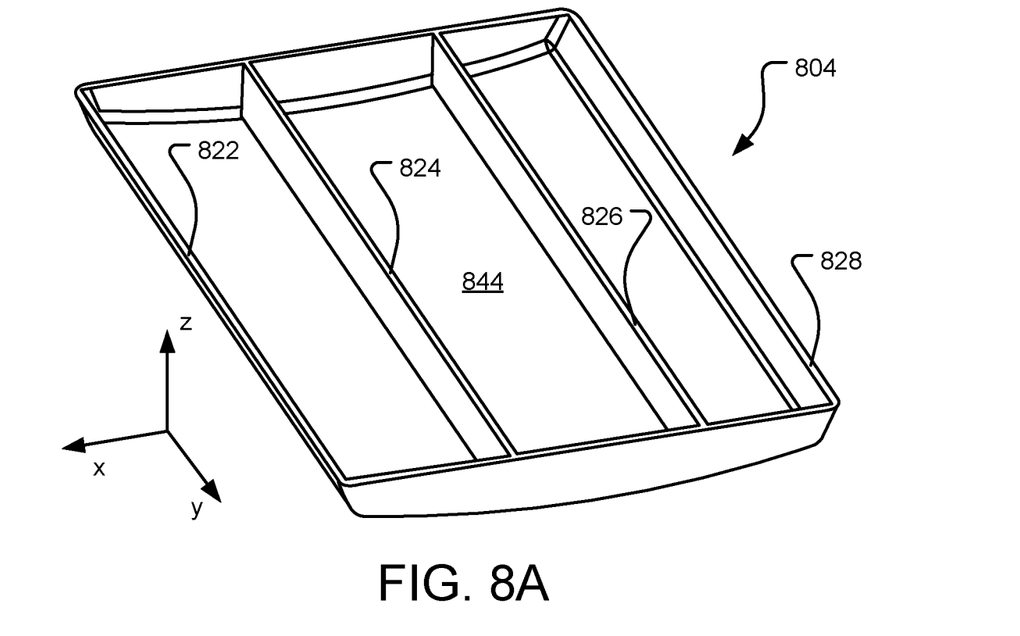
FIG. 8A illustrates an inside perspective view of an example variable thickness enclosure cover.

FIG. 8A illustrates an inside perspective view of an example variable thickness enclosure cover 804. The variable thickness enclosure cover 804 was previously cut from an extruded sheet with a fixed cross-sectional profile in the X-Z plane (see e.g., extruded panel 202 of FIG. 2). Further, portions were previously removed and the perimeter folded to form the variable thickness enclosure cover 804 (see e.g., variable thickness extruded panel 302 of FIG. 3 and the subsequent variable thickness enclosure cover 404 of FIG. 4 formed therefrom).

The cross-sectional profile in the X-Z plane defines increased thickness features 822, 824, 826, 828 and a curved base portion 844. In an example implementation, the increased thickness features 822, 828 run linearly in the Y-direction parallel with and adjacent one or more hinges (not shown, see e.g., hinge 106 of FIG. 1) in order to reinforce the enclosure cover 804 at its mechanical attachment to the hinge(s). Increased thickness features 824, 826 also run linearly in the Y-direction, which serves to generally reinforce the enclosure cover 804 against bending forces, particularly in the X-Y plane. Material was previously removed from distal ends of each of the increased thickness features 822, 824, 826, 828 of the enclosure cover 804, as described above with reference to variable thickness extruded panels 302 and 502 of FIGS. 3 and 5, respectively, for example.

Figure 8B:
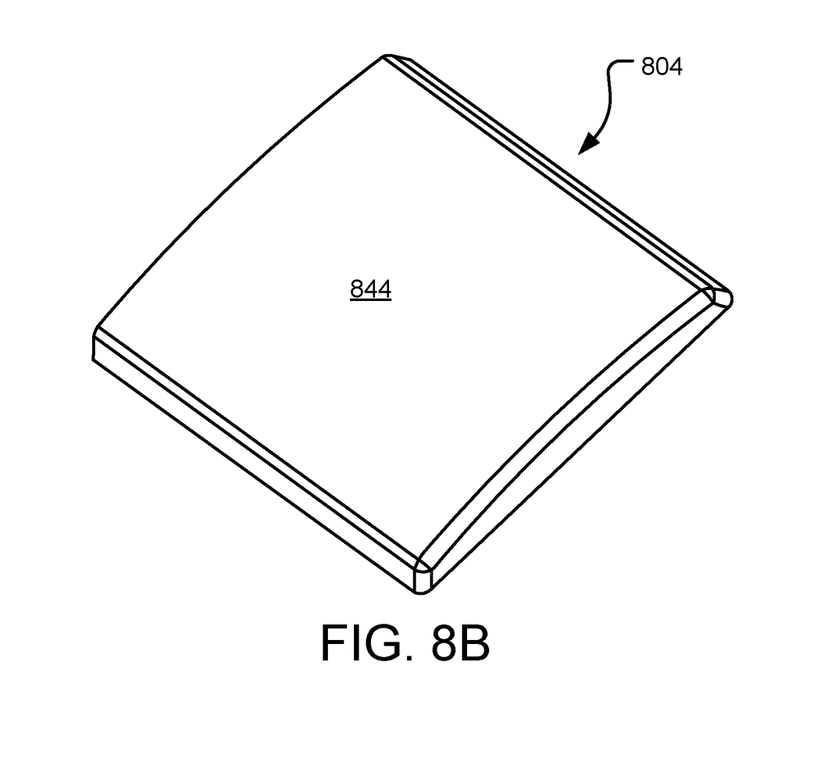
FIG. 8B illustrates an outside perspective view of the example variable thickness enclosure cover of FIG. 8A.

In some implementations, the fixed cross-sectional profile in the X-Z plane (see e.g., extruded panel 202 of FIG. 2) may have a planar base portion (as illustrated by extruded panel 202 of FIG. 2). In other implementations, base portion 844 is curved with a generally convex curvature in the X-Z plane, as illustrated in FIG. 8A. In still further implementations, the base portion may have another curved or other complex cross-sectional profile in the X-Z plane. FIG. 8B illustrates an outside perspective view of the example variable thickness enclosure cover 804 of FIG. 8A. An exterior of the curved base portion 844 is illustrated in FIG. 8B, while an interior of the curved base portion 844 is illustrated in FIG. 8A.

Extruding the curved shape of the base portion 844 may be technically advantageous in that fewer processing steps are necessary to achieve a similar end result in the variable thickness enclosure cover 804 than convention manufacturing techniques that start with a flat extruded (or otherwise manufactured) panel. For example, an additional stamping operation may be conventionally required to manufacture an enclosure cover with a similar curvature as curved base portion 844.

Figure 9A:
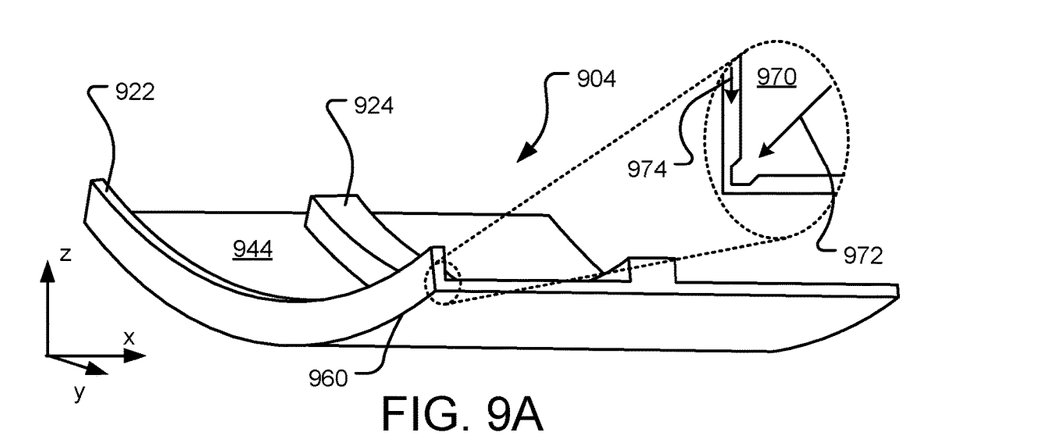
FIG. 9A illustrates a perspective view of an example variable thickness enclosure cover with a small folded edge radius.

FIG. 9A illustrates a perspective view of an example variable thickness enclosure cover 904 with a small folded edge radius 960. The variable thickness enclosure cover 904 was previously cut from an extruded sheet with a fixed cross-sectional profile in the X-Z plane (see e.g., extruded panel 202 of FIG. 2). Further, portions were previously removed and the perimeter folded to form the variable thickness enclosure cover 904 (see e.g., variable thickness extruded panel 302 of FIG. 3 and the subsequent variable thickness enclosure cover 404 of FIG. 4 formed therefrom).

The cross-sectional profile in the X-Z plane defines increased thickness features 922 and a flat base portion 944. In an example implementation, the increased thickness features 922 runs linearly and parallel with and adjacent one or more hinges (not shown, see e.g., hinge 106 of FIG. 1) in order to reinforce the enclosure cover 904 at its mechanical attachment to the hinge(s). Increased thickness feature 924 also runs linearly and serves to generally reinforce the enclosure cover 804 against bending forces, particularly in the X-Y plane.

Material was previously removed from distal ends of each of the increased thickness features 922, 924 of the enclosure cover 904, as described above with reference to variable thickness extruded panels 302 and 502 of FIGS. 3 and 5, respectively, for example. While increased thickness features 922, 924 are described above as running linearly, after a stamping process, which renders the depicted curve on the base portion 944, the increased thickness features 922, 924 are similarly curved to follow the base portion 944.

In some implementations, the fixed cross-sectional profile in the X-Z plane (see e.g., extruded panel 202 of FIG. 2) may have a planar base portion (as illustrated by extruded panel 202 of FIG. 2). In other implementations, a base portion is curved with a generally convex curvature in the X-Z plane (see e.g., base portion 844 of FIGS. 8A-8B) obtained from the panel extrusion. In still further implementations, the base portion 944 is curved with a generally convex curvature in the Y-Z plane created by stamping a previously planar base portion into the depicted variable thickness enclosure cover 904 with the depicted curved base portion 844. In still further implementations, the base portion may have another curved or other complex cross-sectional profile formed with a singular step or combination of steps.

The depicted small folded edge radius 960 may be obtained with tooling having a similarly small edge radius for stamping the variable thickness enclosure cover 904. In an example implementation, the small folded edge radius 960 may be less than 1.0 mm (or approximately 0.1 mm) and the increased thickness feature 922 may be oriented at 30-90 degrees with reference to the base portion 944.

In an example implementation, the depicted small folded edge radius 960 is achieved using a drawing operation followed by a forging operation. For example, the variable thickness enclosure cover 904 is first drawn to achieve a natural (large) radius corner (see e.g., large folded edge radius 962 of FIG. 9B). Then a forging tool 970 with a corner bead is used to force the extruded panel material into a sharp small-radius corner (illustrated by arrow 972) in the depicted corner detail. Further, one of the side walls of the sharp small-radius corner is pushed toward the corner to further provide material to fill the corner, as illustrated by arrow 974. Use of the forging tool 970 to create the sharp small-radius corner is technically advantageous in that it is able to create the sharp small-radius corner without breaking the variable thickness enclosure cover 904 at the corner, and while maintaining a minimum thickness of material at the corner defined by the size of the corner bead of the forging tool 970.

Figure 9B:
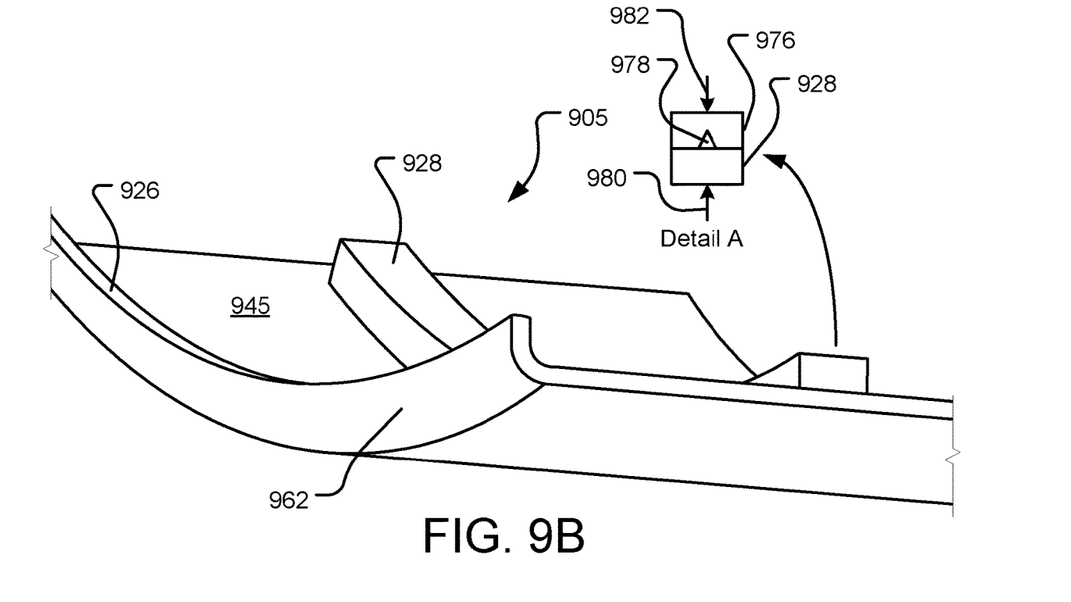
FIG. 9B illustrates a perspective view of an example variable thickness enclosure cover with a large folded edge radius.

FIG. 9B illustrates a perspective view of an example variable thickness enclosure cover 905 with a large folded edge radius 962. Various aspects of the variable thickness enclosure cover 905 may be similar to that described above with reference to variable thickness enclosure cover 904, including increased thickness features 926, 928 and curved base portion 945. The depicted large folded edge radius 962 may be obtained with tooling having a similarly large edge radius for stamping the variable thickness enclosure cover 905. In an example implementation, the large folded edge radius 962 may be greater than 1.0 mm and the increased thickness feature 926 may be oriented at 30-180 degrees with reference to the base portion 945.

Detail A is provided in FIG. 9B illustrating an implementation for stamping the variable thickness enclosure cover 905 using top surface tooling 976 with a relief 978 running along the top surface of the increased thickness feature 928. Compressive force is applied to the increased thickness feature 928, as illustrated by arrows 980, 982. The relief 978 running along the top surface of the increased thickness feature 928 provides an outlet for additional material of the increased thickness feature 928 at its top surface created when the increased thickness feature 928 is stamped into the depicted concave shape. In some implementations, the additional material of the increased thickness feature 928 that flows into the relief 978 during stamping may be polished or otherwise removed during a later processing step. In other implementations, the additional material of the increased thickness feature 928 may be left in place on the increased thickness feature 928.

Lower surface tooling (not shown) does not include a similar relief for forming the depicted concave shape. However, in other implementations, the lower surface tooling would include a relief similar to the relief 978 instead of or in addition to the top surface tooling 976 for a variable thickness enclosure cover to be formed in a convex shape or a more complex shape that includes both convex and concave curvatures.

Figure 10:
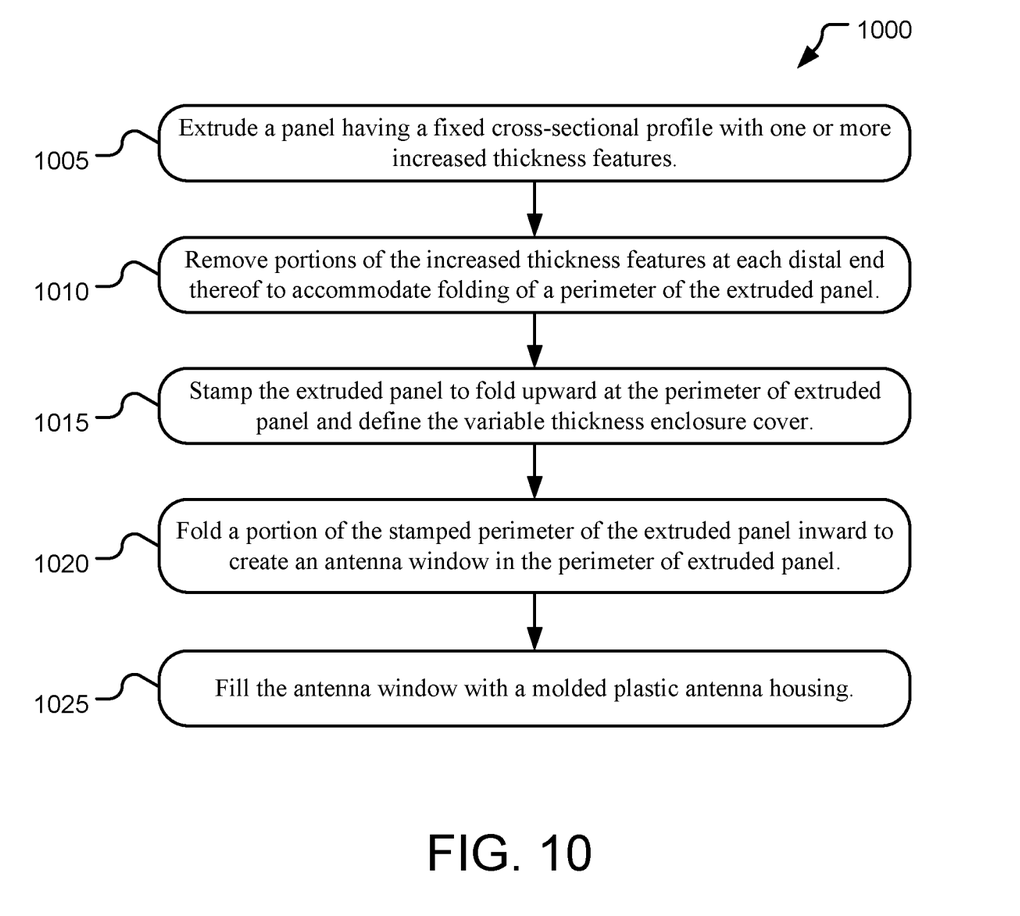
FIG. 10 illustrates example operations for manufacturing a variable thickness enclosure cover.

FIG. 10 illustrates example operations 1000 for manufacturing a variable thickness enclosure cover. An extrusion operation 1005 extrudes a panel having a fixed cross-sectional profile with one or more increased thickness features. The extrusion operation 1005 may be accomplished using any convenient process, including but not limited to hot or cold extrusion and continuous or semi-continuous extrusion processes that push and/or pull through a die having a desired fixed cross-sectional profile. The desired fixed cross-sectional profile defines the one or more increased thickness features, as well as other dimensional characteristics of the variable thickness enclosure cover.

In an example implementation, additional material is provided at the perimeters of the extruded panel to supply additional material to the extruded panel during the following stamping operation 1015 to reduce or prevent corner cracking or wrinkling due to overstretching the material, particularly at corner locations. In some implementations, the additional source material may be an area of increased thickness of the extruded panel or a channeled area of the extruded panel. A removing operation 1010 removes portions of the increased thickness features at each distal end thereof to accommodate folding of a perimeter of the extruded panel. The removing operation may be accomplished using any convenient material removal process, including but not limited to drilling, milling, grinding, and cutting.

A stamping operation 1015 stamps the extruded panel to fold upward at the perimeter of extruded panel and define the variable thickness enclosure cover. In some implementations, the stamping operation 1015 folds the perimeter of the stamped panel flush with the distal ends of the increased thickness feature(s) absent the removed portions. In other implementations, the stamping operation 1015 folds the perimeter of the stamped panel such that it rests against the first increased thickness feature at each distal end of the first increased thickness feature where the portions of the first increased thickness feature are removed. Still further, the stamping operation 1015 folds the perimeter of the stamped panel so that it is flush with distal ends of one increased thickness feature and rests against another increased thickness feature at each distal end of the another increased thickness feature.

In an example implementation, the stamping operation 1015 includes a drawing operation followed by a forging operation. For example, to achieve a sharp small-radius corner (see e.g., small radius 960 of FIG. 9A), the extruded panel is first drawn to achieve a natural (large) radius corner (see e.g., large radius 962 of FIG. 9B), and then a forging tool with a corner bead is used to force the extruded panel material into a sharp small-radius corner. Further, one of the side walls of the sharp small-radius corner may be pushed toward the corner to further provide material to fill the corner.

In another example implementation, the stamping operation 1015 includes using top surface tooling with relief(s) running along the top surface of the increased thickness feature(s). Compressive force is applied to the increased thickness feature(s) and the relief(s) running along the top surface of the increased thickness feature(s) provide an outlet for additional material of the increased thickness feature(s) at their top surfaces created when the increased thickness feature(s) are stamped into a concave shape.

A folding operation 1020 folds a portion of the stamped perimeter of the extruded panel inward to create an antenna window in the perimeter of extruded panel. In some implementations, the folding operation 1020 includes cutting or scribing a line where the upward oriented perimeter of the extruded panel separates from the remainder of the extruded panel to fold inward. A filling operation 1025 fills the antenna window with a molded plastic antenna housing. In various implementations, the plastic antenna housing may be insert molded in place around the folding portion of the stamped perimeter of the extruded panel and adjacent other portions of the extruded panel to lock the plastic antenna housing in place.

While the manufacture and assembly of a singular variable thickness enclosure cover is described in detail in operations 1000, multiple variable thickness enclosure covers may be similarly manufactured and assembled for mobile computing devices that utilize more than one variable thickness enclosure cover.

The logical operations making up the embodiments of the invention described herein may be referred to variously as operations, steps, objects, or modules and may be performed in any order, adding or omitting operations as desired, unless explicitly claimed otherwise or a specific order is inherently necessitated by the claim language. Unless otherwise explicitly defined, dimensions described as substantially or approximately herein are +/−10% of the values provided.

Implementations disclosed and claimed herein provide a method of manufacturing a variable thickness enclosure cover for a computing device. The method comprises extruding a panel having a fixed cross-sectional profile with a first increased thickness feature, removing portions of the first increased thickness feature at each distal end of the first increased thickness feature to accommodate folding of a perimeter of the extruded panel, and stamping the extruded panel to fold upward at the perimeter of extruded panel and define the variable thickness enclosure cover.

Another example method of manufacturing a variable thickness enclosure cover for a computing device may further comprise removing portions of the second increased thickness feature at each distal end of the second increased thickness feature to further accommodate folding of the perimeter of the extruded panel.

In another example method of manufacturing a variable thickness enclosure cover, the folded perimeter of the stamped panel is flush with each distal end of the first increased thickness feature absent the removed portions.

In another example method of manufacturing a variable thickness enclosure cover, the folded perimeter of the stamped panel rests against the first increased thickness feature at each distal end of the first increased thickness feature where the portions of the first increased thickness feature are removed.

Another example method of manufacturing a variable thickness enclosure cover for a computing device may further comprise folding a portion of the perimeter of the stamped panel inward to create an antenna window in the perimeter of extruded panel and filling the antenna window with a molded plastic antenna housing.

In another example method of manufacturing a variable thickness enclosure cover, the extruded panel has a curved bottom surface opposite the first increased thickness feature.

In another example method of manufacturing a variable thickness enclosure cover, the first increased thickness feature serves to reinforce the variable thickness enclosure cover for a hinged attachment in a bi-folding device.

In another example method of manufacturing a variable thickness enclosure cover, the first increased thickness feature provides additional source material for the stamping operation.

In another example method of manufacturing a variable thickness enclosure cover, the stamping operation includes drawing the extruded panel upward at the perimeter to a natural radius and forging the extruded panel to a small radius corner using a tool having an inner corner bead.

In another example method of manufacturing a variable thickness enclosure cover, the stamping operation includes using a tool with a relief to permit material from the first increased thickness feature to flow into the relief when stamping a convex curved bottom surface opposite the first increased thickness feature.

Implementations disclosed and claimed herein provide a variable thickness enclosure cover for a computing device comprising a first extruded panel having a first fixed cross-sectional profile with a first increased thickness feature, wherein portions of the first increased thickness feature are removed at each distal end of the first increased thickness feature to accommodate folding of a perimeter of the first extruded panel, and wherein the first extruded panel is stamped to fold upward at the perimeter of the first extruded panel and define the variable thickness enclosure cover.

In another example variable thickness enclosure cover, the first extruded panel includes a second increased thickness feature.

Another example variable thickness enclosure cover may further comprise a second extruded panel having a second fixed cross-sectional profile with a second increased thickness feature, wherein portions of the second increased thickness feature are removed at each distal end of the second increased thickness feature to accommodate folding of a perimeter of the second extruded panel, and wherein the second extruded panel is stamped to fold upward at the perimeter of the second extruded panel and further define the variable thickness enclosure cover.

In another example variable thickness enclosure cover, the first extruded panel has a curved bottom surface opposite the first increased thickness feature.

Another example variable thickness enclosure cover may further comprise a molded plastic antenna housing filling an antenna window formed in a perimeter of the first extruded panel.

In another example variable thickness enclosure cover, the first extruded panel meets the second extruded panel to enclose internal components of the computing device.

In another example variable thickness enclosure cover, the first increased thickness feature of the first extruded panel meets the second increased thickness feature of the second extruded panel at a hinged connection between the first extruded panel and the second extruded panel.

Implementations disclosed and claimed herein provide a computing device comprising a first extruded panel having a first fixed cross-sectional profile with a first increased thickness feature, wherein portions of the first increased thickness feature are removed at each distal end of the first increased thickness feature to accommodate folding of a perimeter of the first extruded panel, and wherein the first extruded panel is stamped to fold upward at the perimeter of the first extruded panel. The computing device further comprises a second extruded panel having a second fixed cross-sectional profile with a second increased thickness feature, wherein portions of the second increased thickness feature are removed at each distal end of the second increased thickness feature to accommodate folding of a perimeter of the second extruded panel, and wherein the second extruded panel is stamped to fold upward at the perimeter of the second extruded panel, wherein the first extruded panel is assembled with the second extruded panel to define an enclosure that secures electronic components of the computing device.

In another example computing device, the first extruded panel is assembled with the second extruded panel where the first increased thickness feature is adjacent the second increased thickness feature defining a first hinged component. The computing device further comprises a hinge and a second hinged component, wherein the hinge connects the first hinged component to the second hinged component.

In another example computing device, the first hinged component and the second hinged component are each one or more of a keyboard, a display screen, a touchscreen, a touchpad, a kickstand, and a screen cover.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of manufacturing a variable thickness enclosure cover for a computing device comprising:
    extruding a panel having a fixed cross-sectional profile with a first increased thickness feature;
    removing portions of the first increased thickness feature at each distal end of the first increased thickness feature to accommodate folding of a perimeter of the extruded panel;
    stamping the extruded panel to fold upward at the perimeter of the extruded panel and define the variable thickness enclosure cover;
    folding a portion of the perimeter of the stamped panel inward to create an antenna window in the perimeter of the extruded panel; and
    filling the antenna window with a molded plastic antenna housing.

2. The method of claim 1, wherein the fixed cross-sectional profile has a second increased thickness feature, further comprising:
    removing portions of the second increased thickness feature at each distal end of the second increased thickness feature to further accommodate folding of the perimeter of the extruded panel.

3. The method of claim 1, wherein the folded perimeter of the stamped panel is flush with each distal end of the first increased thickness feature absent the removed portions.

4. The method of claim 1, wherein the folded perimeter of the stamped panel rests against the first increased thickness feature at each distal end of the first increased thickness feature where the portions of the first increased thickness feature are removed.

5. The method of claim 1, wherein the extruded panel has a curved bottom surface opposite the first increased thickness feature.

6. The method of claim 1, wherein the first increased thickness feature serves to reinforce the variable thickness enclosure cover for a hinged attachment in a bi-folding device.

7. The method of claim 1, wherein the first increased thickness feature provides additional source material for the stamping operation.

8. The method of claim 1, wherein the stamping operation includes:
    drawing the extruded panel upward at the perimeter to a natural radius; and
    forging the extruded panel to a small radius corner using a tool having an inner corner bead.

9. The method of claim 1, wherein the stamping operation includes:
    using a tool with a relief to permit material from the first increased thickness feature to flow into the relief when stamping a convex curved bottom surface opposite the first increased thickness feature.

\* \* \* \* \*